(12) United States Patent
Shattuck et al.

(10) Patent No.: US 11,580,224 B2
(45) Date of Patent: Feb. 14, 2023

(54) POWER DETECTION FOR IDENTIFYING SUSPICIOUS DEVICES

(71) Applicant: TARGET BRANDS, INC., Minneapolis, MN (US)

(72) Inventors: Kyle Shattuck, Minneapolis, MN (US); Brian Souder, Minneapolis, MN (US); John Holland, Minneapolis, MN (US); Adam Lesperance, Minneapolis, MN (US); Jerome Odegaard, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 329 days.

(21) Appl. No.: 17/118,054

(22) Filed: Dec. 10, 2020

(65) Prior Publication Data

US 2021/0182395 A1 Jun. 17, 2021

Related U.S. Application Data

(60) Provisional application No. 62/947,627, filed on Dec. 13, 2019.

(51) Int. Cl.
*G06F 21/56* (2013.01)
*G06F 1/28* (2006.01)
*G06F 13/10* (2006.01)
*G06F 1/26* (2006.01)

(52) U.S. Cl.
CPC ............ *G06F 21/566* (2013.01); *G06F 1/266* (2013.01); *G06F 1/28* (2013.01); *G06F 13/102* (2013.01); *G06F 2221/034* (2013.01)

(58) Field of Classification Search
CPC .......... G06F 21/566; G06F 1/266; G06F 1/28; G06F 13/102
See application file for complete search history.

(56) References Cited

U.S. PATENT DOCUMENTS

| 6,961,856 B1 | 11/2005 | Kouropoulus |
| 7,962,786 B2 | 6/2011 | Eriksson |
| 9,286,460 B2 | 3/2016 | Soffer et al. |
| 9,342,366 B2 | 5/2016 | Lee et al. |
| 9,471,811 B2 | 10/2016 | Kobres et al. |

(Continued)

*Primary Examiner* — Matthew Smithers
*Assistant Examiner* — Shu Chun Gao
(74) *Attorney, Agent, or Firm* — Hamre, Schumann, Mueller & Larson, P.C.

(57) ABSTRACT

A computer-implemented method includes monitoring, by a power monitor on a computer device, for a peripheral device connection. The peripheral device connection connecting a peripheral device to an input/output port of the computer device. The input/output port is configured to provide power from a power supply of the computer device to the peripheral device. In response to the monitoring for the peripheral device connection identifying the peripheral device connection, the method includes determining, by the power monitor, a device type and a negotiated power of the peripheral device as connected. The power monitor determines whether the negotiated power of the peripheral device as connected matches expected power information. In response to determining the negotiated power of the peripheral device does not match the expected power information, the power monitor takes action on the computer device.

20 Claims, 4 Drawing Sheets

(56) References Cited

U.S. PATENT DOCUMENTS

| | | | |
|---|---|---|---|
| 9,483,668 B2 | 11/2016 | Bytheway | |
| 9,734,358 B2 | 8/2017 | Soffer | |
| 9,934,377 B2 | 4/2018 | Samat et al. | |
| 9,940,487 B2 | 4/2018 | Soffer | |
| 10,185,670 B2 | 1/2019 | Litichever et al. | |
| 2003/0188205 A1* | 10/2003 | Mylly | G06F 1/266 713/300 |
| 2005/0114710 A1 | 5/2005 | Cornell et al. | |
| 2015/0365237 A1 | 12/2015 | Soffer | |
| 2018/0097629 A1 | 4/2018 | Soffer | |
| 2018/0124080 A1 | 5/2018 | Christodorescu et al. | |
| 2018/0166886 A1 | 6/2018 | Ueta | |
| 2019/0042749 A1 | 2/2019 | Appleboum et al. | |
| 2019/0354681 A1* | 11/2019 | Hauser | G06F 21/81 |
| 2020/0256902 A1* | 8/2020 | DeCamp | G01R 21/133 |

\* cited by examiner

POWER DETECTION FOR IDENTIFYING SUSPICIOUS DEVICES

FIELD

This disclosure relates generally to computer devices. More specifically, this disclosure relates to systems and methods for monitoring power information and identifying a suspicious peripheral device interfacing with a computer device.

BACKGROUND

Computer devices can utilize a variety of different peripheral devices. Examples of peripheral devices include, but are not limited to, a printer, a storage device, a keyboard, a mouse, a display, or the like. Peripheral devices can utilize a variety of connection types for connection to the computer devices. Examples of connection types include, but are not limited to, Universal Serial Bus (USB), Serial Connection, FireWire, or the like. Peripheral devices can draw power from the computer device. Peripheral devices have expected power information. Some peripheral devices may operate outside the expected power information.

SUMMARY

This disclosure relates generally to computer devices. More specifically, this disclosure relates to systems and methods for monitoring power information and identifying a suspicious peripheral device interfacing with a computer device.

A computer-implemented method includes monitoring, by a power monitor on a computer device, for a peripheral device connection. The peripheral device connection connects a peripheral device to an input/output port of the computer device. The input/output port is configured to provide power from a power supply of the computer device to the peripheral device. In response to the monitoring for the peripheral device connection identifying the peripheral device connection, the method includes determining, by the power monitor, a device type and a negotiated power of the peripheral device as connected. The power monitor determines whether the negotiated power of the peripheral device as connected matches expected power information. In response to determining the negotiated power of the peripheral device does not match the expected power information, the power monitor takes action on the computer device.

Another computer-implemented method includes monitoring, by a power monitor on a computer device, a connected peripheral device. The connected peripheral device is connected to an input/output port of the computer device. The input/output port is configured to provide power from a power supply of the computer device to the connected peripheral device. The power monitor determines a device type, a negotiated power, and an actual power of the connected peripheral device. The power monitor determines whether the actual power of the connected peripheral device matches the negotiated power of the connected peripheral device. In response to determining the actual power of the connected peripheral device does not match the negotiated power of the connected peripheral device, the power monitor takes action on the computer device.

A system for identifying a suspicious peripheral device is also disclosed. The system includes a computer device, including a processor, a memory, and an input/output port. An application including a power monitor is stored in the memory. The power monitor is configured to monitor for a peripheral device connection of a peripheral device to the input/output port of the computer device. The input/output port is configured to provide power from a power supply of the computer device to the peripheral device as connected. When the peripheral device connection is identified, the power monitor determines a device type and a negotiated power of the peripheral device as connected. The power monitor determines whether the negotiated power of the peripheral device as connected matches expected power information. When the negotiated power of the peripheral device does not match the expected power information, the power monitor takes action on the computer device.

BRIEF DESCRIPTION OF THE DRAWINGS

References are made to the accompanying drawings that form a part of this disclosure, and which illustrate embodiments in which the systems and methods described in this Specification can be practiced.

Like reference numbers represent like parts throughout.

DETAILED DESCRIPTION

Figure 1:
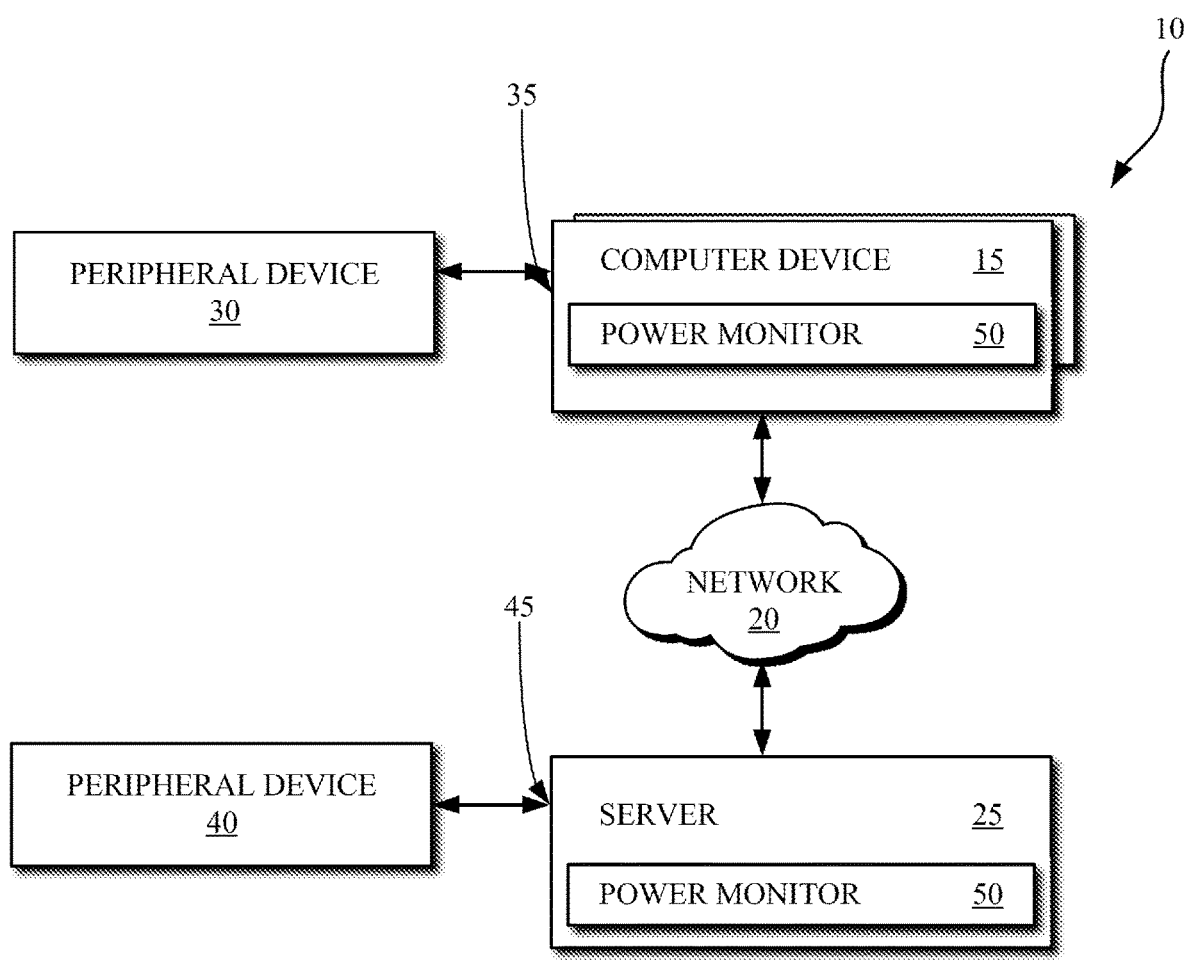
FIG. 1 is a schematic diagram of a system for identifying a suspicious peripheral device, according to an embodiment.

This disclosure relates generally to computer devices. More specifically, this disclosure relates to systems and methods for monitoring power information and identifying a suspicious peripheral device interfacing with a computer device.

In view of the increasingly large number of computer devices and amount of sensitive data accessible via the computer devices, information security is increasingly challenging. The occurrences of attempts for unauthorized access to computer devices are increasing, along with increasing efforts to evade detection. Continued efforts are being made to improve detection of unauthorized access attempts.

Computer devices typically include a number of input/output ports that can be connected to a peripheral device. When connected, the peripheral device can receive power from the computer device. In some instances, an unauthorized access attempt may be made by connecting a peripheral device to a computer device or a system in which the computer device is utilized. The peripheral devices used in such attempts often are masquerading as legitimate peripheral devices. Detection of these suspicious peripheral devices can be critical to preventing unauthorized access to the computer device, a system on which the computer device is installed, or both.

Embodiments of this disclosure are directed to monitoring power information, either actual power usage or negotiated power, relative to a type of peripheral device reported to the operating system of the computer device. The embodiments can be applied to all major operating systems. In an embodiment, the methods and systems described can help identify and reduce potentially malicious hardware devices from enabling unauthorized access to the computer devices or systems on which they are installed.

The systems and methods described can detect suspicious peripheral devices (e.g., when an unauthorized person is attempting to gain access). Power information (actual power usage or negotiated power) can be used to determine whether the peripheral device is actually the type of device it reports to the operating system or whether the device type is being spoofed. To make the determination, expected power usage information for a particular peripheral device type (e.g., a keyboard, a mouse, or the like) is compared against actual power information of the hardware device in real-time. If the power information is different than expected (e.g., differs from a threshold or expected value), then the device is considered to be a suspicious device and further action can be taken.

A "peripheral device" includes a device that is not part of a computer device (e.g., separate from the memory and the processor). The peripheral device can be alternatively referred to as an auxiliary device. Examples of peripheral devices include, but are not limited to, a printer, a storage device, a keyboard, a mouse, a display, or the like.

Peripheral devices can utilize a variety of connection types when being connected to the computer devices. Examples of connection types include, but are not limited to, Universal Serial Bus (USB), Serial Connection, FireWire, or the like. In the embodiments described in this Specification, the peripheral devices can be electrically connected to the computer device such that they receive power from the computer device when connected to the computer device.

"Power information" includes negotiated power and actual power usage.

"Negotiated power" includes a requested power value from a peripheral device to a computer device. The negotiated power can be, for example, a current value and can be in milliamps (mA), amps (A), or the like.

"Actual power" includes an actual power draw from a peripheral device when connected to a computer device. The actual power can be, for example, a measured current value and can be in mA, A, or the like.

An "input/output port" includes any port on a computer device via which a peripheral device is connectable and which is capable of providing power to the peripheral device. In an embodiment, the input/output port can include, for example, a Universal Serial Bus (USB) port, or the like. It is to be appreciated that USB port is one example and is not intended to be limiting.

The described systems and methods can be utilized in a retail setting, for example in a computer device or computer devices of a retailer, including cash registers. It is to be appreciated that the retail setting is an example and the systems and methods can be applied in applications other than a retail setting.

An "application" includes a program or piece of software designed and written to fulfill a particular purpose. An "application" generally refers to an application for execution on a computer device.

FIG. 1 is a schematic diagram of a system 10 for implementing the systems and methods described in this Specification, according to an embodiment. In an embodiment, the system 10 can be utilized by a retailer.

The system 10 can include one or more computer devices 15 in electronic communication with one or more servers 25 via a network 20. Examples of the computer devices 15 include, but are not limited to, a personal computer (PC), a laptop computer, a cash register, or the like. The computer devices 15 generally include a display device and an input device. Examples of the display devices for the computer devices 15 include, but are not limited to, a monitor connected to a PC, a laptop screen, or the like. Examples of the input devices for the computer devices 15 include, but are not limited to, a keyboard, a mouse, a trackball, a button, a voice command, a proximity sensor, a touch sensor, an ocular sensing device for determining an input based on eye movements (e.g., scrolling based on an eye movement), suitable combinations thereof, or the like. Aspects of the computer devices 15 can be the same as or similar to aspects of the user devices 501 as shown and described in accordance with FIG. 4 below.

The network 20 may be representative of the Internet. In an embodiment, the network 20 can include a local area network (LAN), a wide area network (WAN), a wireless network, a cellular data network, suitable combinations thereof, or the like. Aspects of the network 20 can be the same as or similar to aspects of the network 540 as shown and described in accordance with FIG. 4 below.

Aspects of the server 25 are the same as or similar to aspects of a server device 535 as described in accordance with FIG. 4 below. The illustrated embodiment includes a single server 25. It is to be appreciated that this is an example and that a plurality of servers 25 can be included in the system 10. Further, the methods described in this Specification may be applied in a system that does not include a server.

It is to be appreciated that various roles of computer devices 15 and server 25 may be distributed. For example, a power monitor 50 (described in additional detail below) can be installed completely on the computer devices 15, completely on the server 25, or can include a portion installed on the computer devices 15 and a portion on the server 25.

A peripheral device 30 can be connected to the computer device 15 in electrical communication via an input/output port 35. The illustrated embodiment includes a single peripheral device 30 connected to a single input/output port 35. It is to be appreciated that this is an example and that a plurality of input/output ports 35 can be included in the computer device 15 and each of a plurality of peripheral devices 30 can be connected to a separate input/output port of the plurality of input/output ports 35. In an embodiment, the peripheral device 30 can be a USB hub or the like that includes a plurality of input/output ports that are capable of being connected to the USB hub, and correspondingly, the input/output port 35 and computer device 15.

A peripheral device 40 can be connected to the server 25 in electrical communication via an input/output port 45. The illustrated embodiment includes a single peripheral device 40 connected to a single input/output port 45. It is to be appreciated that this is an example and that a plurality of input/output ports 45 can be included in the system 10 and each of a plurality of peripheral devices 40 can be connected to a separate input/output port of the plurality of input/output ports 45. In an embodiment, the peripheral device 40 can be a USB hub or the like that includes a plurality of input/output ports that are capable of being connected to the USB hub, and correspondingly, the input/output port 45 and server 25.

When connected to the input/output port 35, the peripheral device 30 can negotiate an amount of power with the computer device 15 to receive power from a power supply of the computer device 15 and enable the functionality of the peripheral device 30.

In some instances, a peripheral device can be used to masquerade as another type of peripheral device. For example, a USB device can be connected to the computer device 15 and be configured to identify itself as a keyboard.

Thus, the peripheral device 30 may have a device type of "keyboard" that is provided to the computer device 15. However, as the USB device is not a keyboard, the USB device may negotiate an amount of power that is atypical of a keyboard type peripheral device. In such an embodiment, the peripheral device 30 may be considered to be a suspicious device.

The methods (FIGS. 2, 3) of this Specification can be used to identify the discrepancy and enable the computer device 15, the server 25, or a combination thereof, to take an action accordingly.

Actions can include, for example, logging an occurrence to a log file to alert a member of the information technology (IT) support team (or other user); messaging (via email, text message, or the like) a member of the information technology (IT) support team (or other user); launching an application that scans the computer device 15 and the attached USB device for threats; isolating the computer device 15 from the network 20; suitable combinations thereof, or the like. In an embodiment, the computer device 15 can be forcefully shut down; the USB device can be disconnected from the computer device 15; suitable combinations thereof; or the like.

The computer device 15 and the server 25 can include the same or similar features. Accordingly, for simplicity of this Specification, the description is focused on the computer device 15. It is to be appreciated that the server 25 can include similar components and be configured in a similar manner as the computer device 15.

The computer device 15 includes a port 35. The port 35 is representative of an input/output port that is capable of receiving a peripheral device (e.g., the peripheral device 30) and providing power to the peripheral device 30. In an embodiment, the port 35 can be a USB port, a FireWire port, a serial port, or the like.

The computer device 15 includes the power monitor 50. The power monitor 50 can be, for example, an application installed in a memory (520 in FIG. 4) of the computer device 15 and that is executed by a processor (510 in FIG. 4) of the computer device 15. The computer devices 15 can be the same as or similar to the user devices 501 as shown and described in accordance with FIG. 4 below.

The power monitor 50 can be enabled whenever the computer device 15 is powered on. The power monitor 50, as further described with respect to FIGS. 2 and 3 below, can monitor for new peripheral device connections (or can monitor existing connections) and identify a suspicious peripheral device. In an embodiment, the power monitor 50 can be enabled on a periodic basis. For example, the power monitor 50 can be enabled every minute, several minutes, hour, hours, day, or days. The period can be set based on, for example, a user preference. In an embodiment, the power monitor 50 can complete a full scan of the computer device 15 on startup of the computer device 15, and then can rescan highlighting only those items that have changed since the initial scan. That is, the power monitor 50 may not provide duplicative results to the user, but only results as power information changes.

A suspicious peripheral device may be identified when the device type and power information do not correspond to expected power information (either negotiated or actual).

In an embodiment, the power information can include the negotiated power. In such an embodiment, the negotiated power of the connected peripheral device can be compared with an expected negotiated power range corresponding to an expected value. The expected value can be set for a particular peripheral device type. For example, a keyboard may have an expected negotiated power of 100 mA. A peripheral device connected with the device type of "keyboard" is thus expected to negotiate power of at or about 100 mA. If the power monitor 50 identifies a connected peripheral device having the device type of keyboard with a negotiated power that does not equal 100 mA, the peripheral device may be identified as a suspicious device. It is to be appreciated that the above values are examples and the actual values can vary beyond the stated values. Accordingly, the power monitor 50 can identify a suspicious device without requiring the actual power used by the connected peripheral device.

To reduce a likelihood of false positives, the power monitor 50 may include a range (e.g., a constant such as 10 mA, a percentage of the expected value (e.g., 10% of 100 mA), or the like). In such an embodiment, the power monitor 50 may only identify a peripheral device as suspicious if the negotiated power is outside the range from the expected value.

In an embodiment, the power information can include an actual power and a negotiated power. In such an embodiment, the actual power used by the connected peripheral device may vary from the negotiated power of the connected peripheral device.

By way of example, a keyboard may have a negotiated power of 100 mA. A peripheral device connected with the device type of "keyboard" is thus expected to use at or about 100 mA or less than 100 mA. If the power monitor 50 identifies a connected peripheral device having the device type of keyboard with an actual power that is greater than 100 mA, the peripheral device may be identified as a suspicious device. Accordingly, the power monitor 50 can identify a suspicious device without requiring an expected negotiated power of the connected peripheral device.

To reduce a likelihood of false positives, the power monitor 50 may include a range (e.g., a constant such as 10 mA, a percentage of the expected value (e.g., 10% of 100 mA), or the like). In such an embodiment, the power monitor 50 may only identify a peripheral device as suspicious if the actual power is outside the range from the expected value. The deviation can be above or below the expected value.

When the power monitor 50 identifies a peripheral device as being suspicious, the power monitor 50 can take further action.

The further action can include, for example, messaging (email, text message, or the like) a member of the information technology (IT) support team; launching an application that scans the computer device 15 and the suspicious peripheral device for threats; isolating the computer device 15 from the network 20; suitable combinations thereof, or the like.

In an embodiment, the computer device 15 can be forcefully shut down; the USB device can be disconnected from the computer device 15; suitable combinations thereof; or the like.

Figure 2:
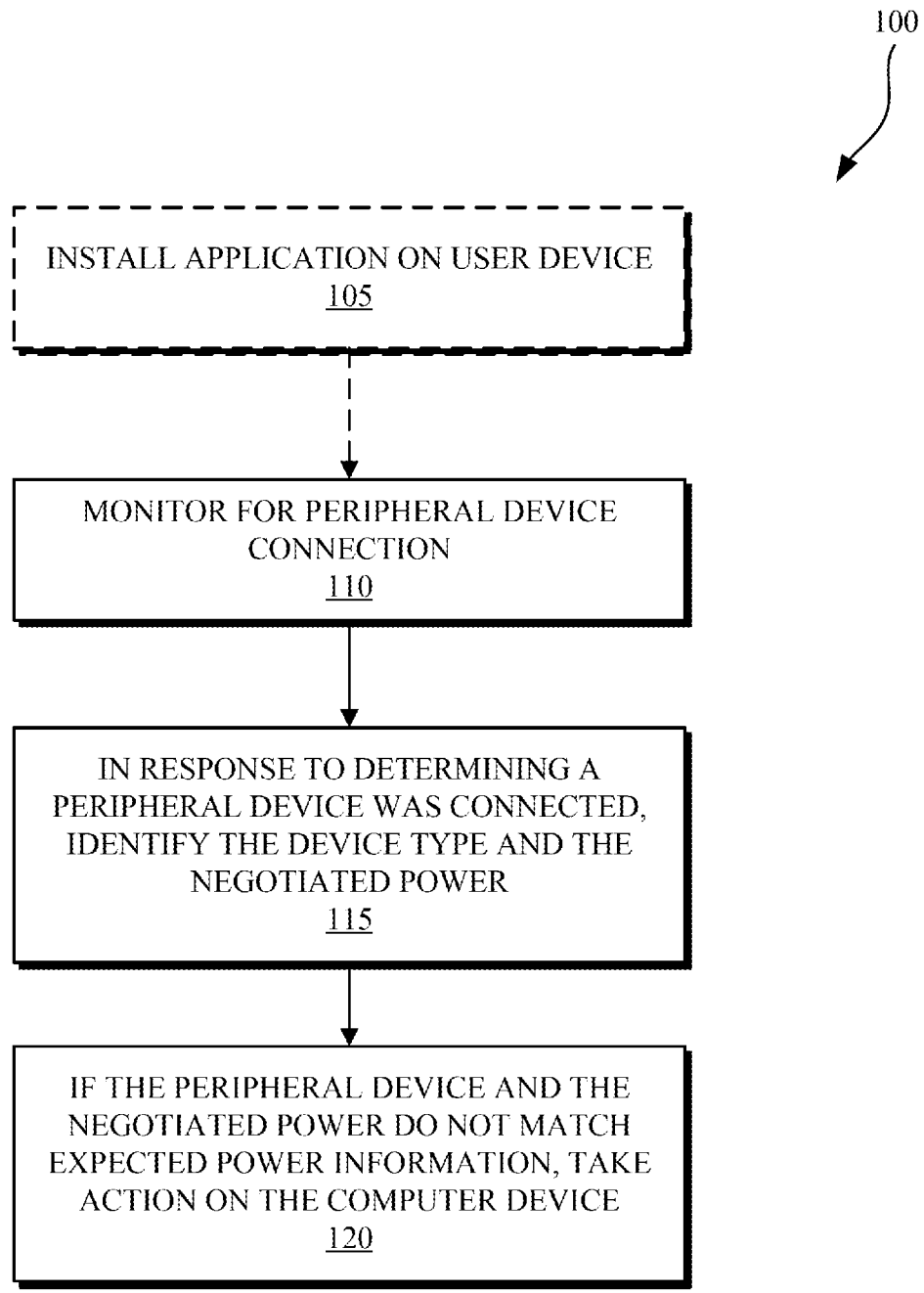
FIG. 2 is a flowchart of a method for identifying a suspicious peripheral device, according to an embodiment.

FIG. 2 is a flowchart of a method 100 for identifying a suspicious peripheral device, according to an embodiment. The method generally includes monitoring a computer device (e.g., the computer device 15), a server (e.g., the server 25), or the like for peripheral device connections that include an atypical negotiated power.

The method 100 can optionally include installation of a power monitor (e.g., the power monitor 50 in FIG. 1) on the computer device (e.g., the computer device 15 or the server 25 in FIG. 1) at 105. In an embodiment, the power monitor 50 may already be installed on the computer device 15 or the server 25. In such an embodiment, the method 100 can begin directly at 110. In an embodiment, at 105 the power monitor 50 may not be installed, but instead may be initialized on the computer device 15 or the server 25. In an embodiment, this can include registering the power monitor 50 within the operating system of the computer device 15. In an embodiment, this can happen every time the computer device 15 or the server 25 is turned on. In an embodiment, this initialization can be controlled to reduce an amount of processor capacity consumed during the startup of the computer device 15 or the server 25.

At 110, the power monitor 50 monitors for a peripheral device connection. For example, the power monitor 50 can be initiated via a scheduled task from the computer device 15 since the computer device 15 has triggers for when a new peripheral device is connected.

At 115, when the power monitor 50 has received an indication from the processor that a peripheral device (e.g. the peripheral device 30 in FIG. 1) has been connected to the computer device 15, the power monitor 50 determines the device type and the negotiated power. In an embodiment, the power monitor 50 can obtain the device type and the negotiated power from the operating system installed on the computer device 15. The power information (e.g., negotiated power) and the device type can be received from the peripheral device 30 by the operating system in order to be functional, and queried by the power monitor 50.

At 120, if the peripheral device 30 and the negotiated power do not match expected power information, the power monitor 50 takes action on the computer device 15.

Actions can include, for example, messaging (via email, text message, or the like) a member of the information technology (IT) support team (or other user); launching an application that scans the computer device 15 and the attached USB device for threats; isolating the computer device 15 from the network 20; suitable combinations thereof, or the like. In an embodiment, the computer device 15 can be forcefully shut down; the USB device can be disconnected from the computer device 15; suitable combinations thereof; or the like.

At 120, if the peripheral device 30 and the negotiated power match expected power information, the power monitor 50 continues to monitor for further peripheral devices 30 to be connected to the computer device 15 by returning to 110.

It is to be appreciated that the expected power information may be predetermined for a plurality of device types.

In an embodiment, the expected power information can be based on power requirements specified in a user manual for a particular peripheral device.

In an embodiment, the expected power information can be determined based on a review of peripheral devices connected and having a known hardware type. For example, a computer device 15 can include a plurality of connected peripheral devices, and the power monitor 50 can determine the negotiated power for each of these devices. This can, for example, be a calibration process for the power monitor 50. The calibration process can be performed for all computer devices 15 in a network (e.g., for a retailer or the like). The negotiated power as gathered can be used to set the expected value for the different peripheral device types. The expected values and corresponding peripheral device types can be stored in the power monitor 50 or in a memory accessible by the power monitor 50. In an embodiment, the negotiated power can be monitored over time and used to update the expected value based on the historical information.

The preceding description for the method 100 generally references the computer device 15 having the power monitor 50. It is to be appreciated that the functionality is the same for the server 25 and power monitor 50. For simplicity of this Specification, the description is not repeated for the server 25.

Figure 3:
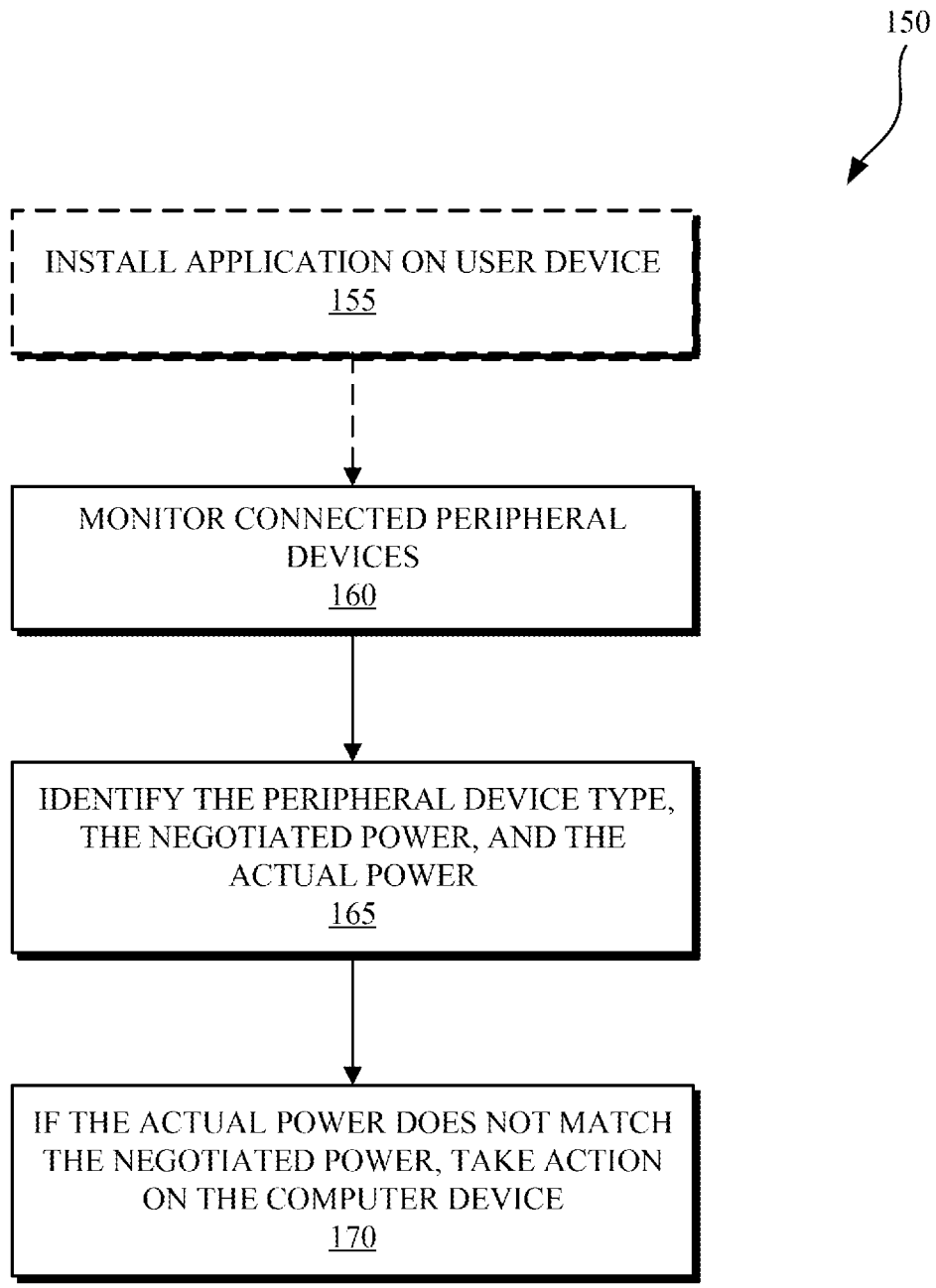
FIG. 3 is a flowchart of a method for identifying a suspicious peripheral device, according to another embodiment.

FIG. 3 is a flowchart of a method 150 identifying a suspicious peripheral device, according to another embodiment. The method 150 can be implemented independently from the method 100, according to an embodiment. In another embodiment, the method 100 and the method 150 can be implemented together. The method generally includes monitoring a computer device (e.g., the computer device 15), a server (e.g., the server 25), or the like for peripheral device connections that include actual power usage that does not correspond to the negotiated power.

The method 150 can optionally include installation of a power monitor (e.g., the power monitor 50 in FIG. 1) on the computer device (e.g., the computer device 15 or the server 25 in FIG. 1) at 155. In an embodiment, the application may already be installed on the computer device 15 or the server 25. In such an embodiment, the method 150 can begin directly at 160.

At 160, the power monitor 50 monitors connected peripheral devices (e.g., the peripheral device 30 in FIG. 1). In an embodiment, this can be a polling that takes place on a periodic basis or can be triggered by a new connection to the computer device.

At 165, the power monitor 50 determines a device type, negotiated power, and actual power usage. In an embodiment, the power monitor 50 can obtain the device type, the negotiated power, and the actual power usage from the operating system installed on the computer device 15.

At 170, if the actual power usage of the peripheral device 30 and the negotiated power do not match, the power monitor 50 can take action on the computer device 15.

Actions can include, for example, messaging (via email, text message, or the like) a member of the information technology (IT) support team (or other user); launching an application that scans the computer device 15 and the attached USB device for threats; isolating the computer device 15 from the network 20; suitable combinations thereof, or the like. In an embodiment, the computer device 15 can be forcefully shut down; the USB device can be disconnected from the computer device 15; suitable combinations thereof; or the like.

At 170, if the actual power usage of the peripheral device 30 and the negotiated power match, the power monitor 50 continues to monitor the connected peripheral devices 30 by returning to 160.

Figure 4:
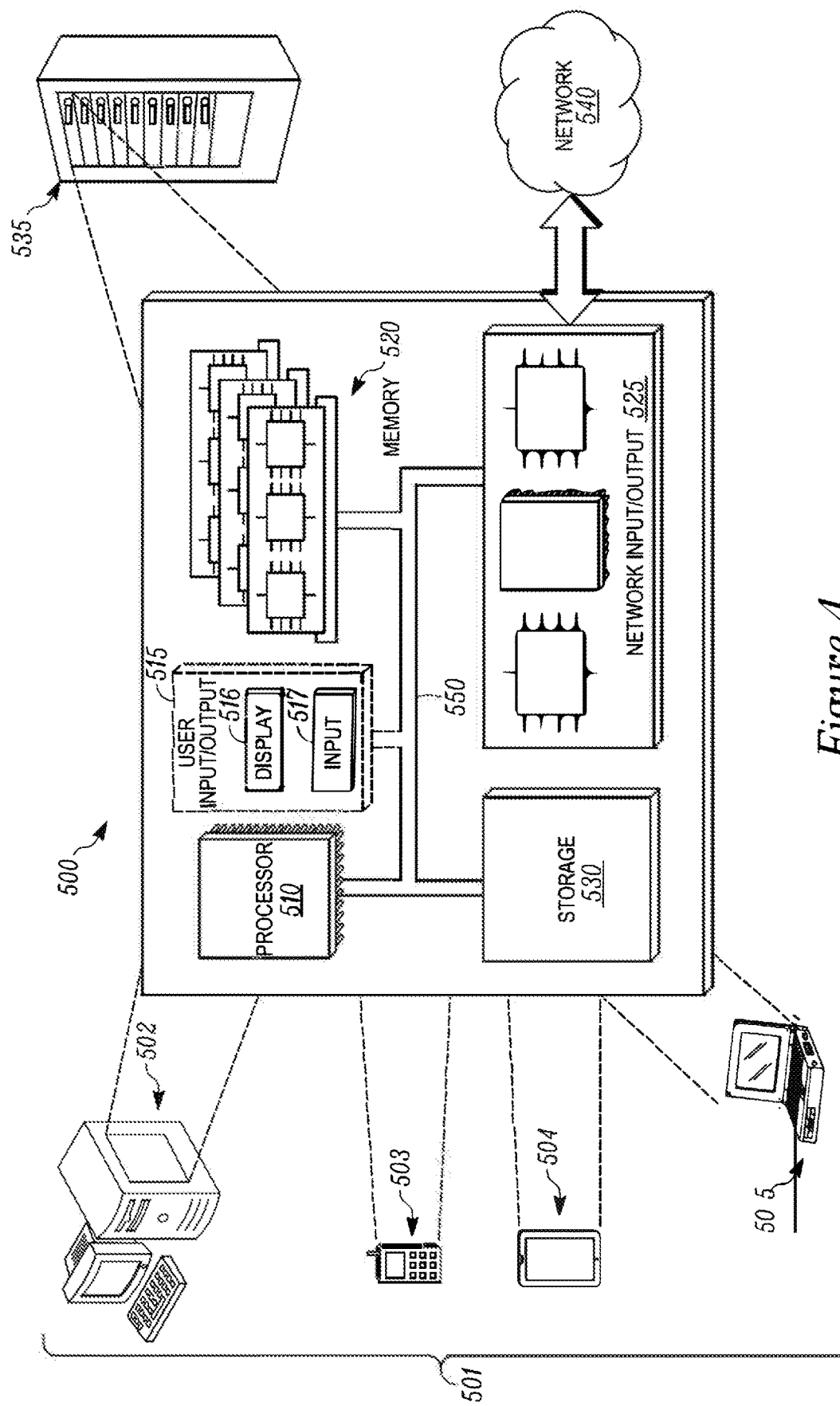
FIG. 4 is a schematic diagram of architecture for a computer device, according to an embodiment.

FIG. 4 is a schematic diagram of architecture for a computer device 500, according to an embodiment. The computer device 500 and any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are examples and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a wearable device, a personal digital assistant (PDA), a video game console, a television, or the like. In an embodiment, the user devices 501 can alternatively be referred to as client devices 501. In such an embodiment, the client devices 501 can be in communication with the server device 535 through the network 540. One or more of the client devices 501 can be in communication with another of the client devices 501 through the network 540 in an embodiment.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can be, for example, one or more busses or the like. The processor 510 can be a single processor, multiple processors, or a single processor having multiple processing cores. In some embodiments, the processor 510 can be a single-threaded processor. In an embodiment, the processor 510 can be a multi-threaded processor.

The user I/O 515 can include a display 516 and/or an input 517, according to an embodiment. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In some embodiments, the display 516 and input 517 can be physically included with the computer device 500 for the desktop computer 502. In an embodiment, the user I/O 515 can physically be part of the user device 501. For example, the cellular/mobile phone 503, the tablet device 504, and the laptop 505 include the display 516 and input 517 that are part of the computer device 500. The server device 535 generally may not include the user I/O 515. In an embodiment, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or input means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using Wi-Fi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server 535 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer device to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

An embodiment can be provided to an end-user through a cloud-computing infrastructure. Cloud computing generally includes the provision of scalable computing resources as a service over a network (e.g., the Internet or the like).

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A computer-implemented method, comprising:
   monitoring, by a power monitor on a computer device, for a peripheral device connection, the peripheral device connection connecting a peripheral device to an input/output port of the computer device, the input/output port configured to provide power from a power supply of the computer device to the peripheral device;
   determining, by the power monitor, a device type and a negotiated power of the peripheral device as connected in response to the monitoring for the peripheral device connection identifying the peripheral device connection;
   determining, by the power monitor, whether the negotiated power of the peripheral device as connected matches expected power information; and
   in response to determining the negotiated power of the peripheral device does not match the expected power information, taking action on the computer device.

2. The method of claim 1, wherein in response to determining the negotiated power of the peripheral device matches the expected power information, continuing the monitoring for the peripheral device connection.

3. The method of claim 1, wherein taking action includes at least one of: messaging a member of the information technology (IT) support team or another user; launching an application that scans the computer device and the peripheral device as connected for threats; isolating the computer device from a network; shutting down the computer device; and disconnecting the peripheral device as connected from the computer device.

4. The method of claim 1, wherein the power monitor is an application installed in a memory of the computer device.

5. The method of claim 1, wherein the computer device is connected to a server through a network, and the power monitor is an application installed in a memory of the server.

6. The method of claim 1, wherein the expected power information includes a negotiated power expected value corresponding to the device type of the peripheral device as connected.

7. The method of claim 6, wherein the negotiated power expected value includes a range.

8. A computer-implemented method, comprising:
   monitoring, by a power monitor on a computer device, a connected peripheral device, the connected peripheral device being connected to an input/output port of the computer device, the input/output port configured to provide power from a power supply of the computer device to the connected peripheral device;
   determining, by the power monitor, a device type, a negotiated power, and an actual power of the connected peripheral device;
   determining, by the power monitor, whether the actual power of the connected peripheral device matches the negotiated power of the connected peripheral device; and
   in response to determining the actual power of the connected peripheral device does not match the negotiated power of the connected peripheral device, taking action on the computer device.

9. The method of claim 8, further comprising: in response to determining the actual power of the connected peripheral device matches the negotiated power of the connected peripheral device, continuing the monitoring of the connected peripheral device.

10. The method of claim 8, wherein taking action includes at least one of: messaging a member of the information technology (IT) support team or another user; launching an application that scans the computer device and the peripheral device as connected for threats; isolating the computer device from a network; shutting down the computer device; and disconnecting the peripheral device as connected from the computer device.

11. The method of claim 8, wherein the power monitor is an application installed in a memory of the computer device.

12. The method of claim 8, wherein the computer device is connected to a server through a network, and the power monitor is an application installed in a memory of the server.

13. The method of claim 8, wherein the negotiated power is used as an expected value corresponding to the connected peripheral device.

14. The method of claim 13, wherein the expected value includes a range.

15. A system for identifying a suspicious peripheral device, comprising:
   a computer device, comprising:
      a processor, a memory, and an input/output port;
      wherein an application including a power monitor is stored in the memory, the power monitor configured to:
         monitor for a peripheral device connection, the peripheral device connection connecting a peripheral device to the input/output port of the computer device, the input/output port configured to provide power from a power supply of the computer device to the peripheral device as connected;
         determine a device type and a negotiated power of the peripheral device as connected in response to the monitoring for the peripheral device connection identifying the peripheral device connection;
         determine whether the negotiated power of the peripheral device as connected matches expected power information; and
         in response to determining the negotiated power of the peripheral device does not match the expected power information, take action on the computer device.

16. The system of claim 15, wherein when the negotiated power of the peripheral device matches the expected power information, continuing to monitor for the peripheral device connection.

17. The system of claim 15, wherein the action includes at least one of: messaging a member of the information technology (IT) support team or another user; launching an application that scans the computer device and the peripheral device as connected for threats; isolating the computer device from a network; shutting down the computer device; and disconnecting the peripheral device as connected from the computer device.

18. The system of claim 15, wherein the computer device is a server.

19. The system of claim 15, wherein the computer device is connected to a server through a network, and the power monitor is an application installed in a memory of the server.

20. The system of claim 15, wherein the expected power information includes a negotiated power expected value corresponding to the device type of the peripheral device as connected.

\* \* \* \* \*